US012753647B2

(12) United States Patent
Choi et al.

(10) Patent No.: US 12,753,647 B2
(45) Date of Patent: Oct. 6, 2026

(54) VEHICLE DOOR PINCH DETECTION DEVICE

(71) Applicants: Hyundai Motor Company, Seoul (KR); Kia Corporation, Seoul (KR); WINNERCOM CO., LTD., Gimhae-si (KR)

(72) Inventors: Hyung-Sik Choi, Hwaseong-Si (KR); Jae-Seung Lee, Hwaseong-Si (KR); Ho-Dong Kim, Hwaseong-Si (KR); Sang-Hyun Lee, Hwaseong-Si (KR); Hak-Hui Choi, Bucheon-Si (KR); Eui-Suk Jeong, Bucheon-Si (KR); Jun-Young Shin, Suwon-Si (KR); Hu-Min Jung, Hanam-Si (KR)

(73) Assignees: Hyundai Motor Company, Seoul (KR); Kia Corporation, Seoul (KR); WINNERCOM CO., LTD., Gimhae-si (KR)

( * ) Notice: Subject to any disclaimer, the term of this patent is extended or adjusted under 35 U.S.C. 154(b) by 0 days.

(21) Appl. No.: 18/958,710

(22) Filed: Nov. 25, 2024

(65) Prior Publication Data

US 2025/0270867 A1 Aug. 28, 2025

(30) Foreign Application Priority Data

Feb. 28, 2024 (KR) ........................ 10-2024-0029172

(51) Int. Cl.
*E05F 15/44* (2015.01)
*B60J 5/04* (2006.01)
*B60J 10/86* (2016.01)

(52) U.S. Cl.
CPC ............. *E05F 15/44* (2015.01); *B60J 5/0479* (2013.01); *B60J 10/86* (2016.02); *E05Y 2900/531* (2013.01)

(58) Field of Classification Search
CPC ......... E05F 15/42; E05F 15/44; B60J 5/0479; B60J 10/86
See application file for complete search history.

(56) References Cited

U.S. PATENT DOCUMENTS 7,000,352 B2 * 2/2006 Ishihara .................. E05F 15/44 49/28
8,572,891 B2 * 11/2013 Pribisic .................. G01V 3/088 49/506

(Continued)

FOREIGN PATENT DOCUMENTS

CN 111963037 * 11/2020
JP 2011-52433 * 3/2011
KR 10-2018-0067987 A 6/2018

*Primary Examiner* — Gregory J Strimbu
(74) *Attorney, Agent, or Firm* — MORGAN, LEWIS & BOCKIUS LLP

(57) ABSTRACT

A vehicle door pinch detection apparatus includes a door provided on one side of a vehicle, an external pinch sensor configured for detecting a pinch of an object on an external side of the door when an end portion of the door is adjacent a body of the vehicle or another door of the vehicle upon closing of the door, and an internal pinch sensor configured for detecting a pinch of an object on an internal side of the door at when the end portion of the door is adjacent the body or the another door of the vehicle upon closing of the door.

16 Claims, 9 Drawing Sheets

(56) References Cited

U.S. PATENT DOCUMENTS

| | | | | |
|---|---|---|---|---|
| 2006/0131915 | A1* | 6/2006 | Ogino | E05F 15/44 49/31 |
| 2012/0267914 | A1* | 10/2012 | Thiele | B60J 5/06 296/146.9 |
| 2015/0369941 | A1* | 12/2015 | Pribisic | G01D 5/16 324/658 |
| 2016/0137043 | A1* | 5/2016 | Baba | B60J 10/277 49/483.1 |
| 2020/0002990 | A1* | 1/2020 | Kawase | E05F 15/42 |
| 2020/0300018 | A1* | 9/2020 | Kamitani | B60J 10/25 |
| 2021/0109246 | A1* | 4/2021 | Matsumoto | B60J 5/06 |
| 2023/0039719 | A1* | 2/2023 | Shingu | B60J 5/0468 |

* cited by examiner

VEHICLE DOOR PINCH DETECTION DEVICE

CROSS-REFERENCE TO RELATED APPLICATION

The present application claims priority to Korean Patent Application No. 10-2024-0029172, filed on Feb. 28, 2024, the entire contents of which is incorporated herein for all purposes by this reference.

BACKGROUND OF THE PRESENT DISCLOSURE

Field of the Present Disclosure

The present disclosure relates to a vehicle door pinch detection apparatus adapted to a vehicle door to detect pinching of an occupant's body while closing of the vehicle door and more particularly, to a vehicle door pinch detection apparatus configured for detecting door pinch situations from an inside and an outside of a vehicle to improve detection performance.

Description of Related Art

Anti-pinch sensors are provided on a vehicle door to detect a pinch of an occupant's body or belongings between a vehicle door being closed and a vehicle body, or between the vehicle doors when the occupant gets in or out of the vehicle.

The anti-pinch sensors are typically provided inside a weather strip provided around a periphery of the vehicle door, so that in the event of the pinch, the weather strip is first deformed and then the anti-pinch sensors detect a deformation of the weather strip and therefore an occurrence of the pinch.

Purpose-built vehicles (PBVs) that operate based on autonomous driving are expected to be utilized as passenger transportation vehicles. As the PBVs are operated without a driver, there is a need to increase a reliability of the in-vehicle safety systems.

For example, a pinch occurring upon the door closing needs to be detected very precisely in the absence of the driver to avoid unnecessary malfunctions and safety accidents.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle door pinch detection apparatus configured for detecting door pinch situations from an inside and an outside of a vehicle to improve detection performance.

Various aspects of the present disclosure are directed to providing a vehicle door pinch detection apparatus with improved detection performance, the device including: a door provided on one side of a vehicle; an external pinch sensor configured for detecting a pinch on an external side of the door at a position where an end portion of the door abuts against a body of the vehicle or another door of the vehicle upon closing of the door; and an internal pinch sensor configured for detecting a pinch on an internal side of the door at a position where the end portion of the door abuts against the body of the vehicle or another door of the vehicle upon closing of the door.

The external pinch sensor may be provided in an external weather strip provided on an external side of the door, and the internal pinch sensor may be provided in an internal weather strip provided on an internal side of the door.

The external weather strip may include: a first fixing portion fixedly fitted to the door, a first insert inserted into the first fixing portion; a first sealing portion formed on an external side of the first fixing portion to abut against the body of the vehicle or another door of the vehicle; and a first sensor portion formed to be connected to the first sealing portion from the external side of the first fixing portion, wherein the external pinch sensor is provided in an interior of the first sensor portion.

The external pinch sensor may be a contact sensor configured for detecting a pinch with a variable resistance and including a plurality of members spaced apart from each other.

The external pinch sensor may include a first member mounted on one side of the interior of the first sensor portion, and a second member mounted spaced apart from the first member on the other side of the interior of the first sensor portion.

The external weather strip may be made of a non-conductive rubber, and the first member and the second member may be made of a conductive rubber.

The first member and the second member may be configured to be electrically connected to each other when the external weather strip is deformed due to the pinch.

One of the first member and the second member may be formed in the shape of a concave groove, and the other of the first member and the second member may be formed in the shape of a protrusion to be accommodated in the concave groove.

The external weather strip may include a bridge portion formed between the first sealing portion and the first sensor portion to separate the first sealing portion and the first sensor portion.

The internal weather strip may include: a second fixing portion fixedly fitted to the door, a second insert inserted into the second fixing portion; a second sealing portion formed on an external side of the second fixing portion to abut against the body of the vehicle or the other door of the vehicle; and a second sensor portion formed to protrude from the second fixing portion at a position spaced apart from the second sealing portion, wherein the internal pinch sensor is provided on the interior of the second sensor portion.

The internal pinch sensor may be a non-contact sensor configured for detecting a pinch with a change in impedance when the occupant's body touches the second sensor portion.

Two or more internal pinch sensors may be provided to be spaced apart from each other in the second sensor portion in a direction in which the second sensor portion protrudes.

The second sensor portion may be made of a non-conductive rubber.

The door may include sliding-type front and rear door sections slidably provided on the vehicle in a longitudinal direction of the vehicle, wherein the external weather strip and the internal weather strip are provided on a front end portion of the rear door section in a height direction of the vehicle, and when the front door section and the rear door section are closed, the external weather strip and the internal weather strip abut against a rear end portion of the front door section.

The first sealing portion may be formed in a hollow shape on the external side of the first fixing portion.

The first sensor portion may be formed in a hollow shape to accommodate the external pinch sensor therein.

The second sealing portion may be formed in a hollow shape on the external side of the second fixing portion.

The second sensor portion may be formed to surround a portion of an external side of a door trim of the door on which the internal weather strip is provided.

The first insert may be previously inserted into the interior of the first fixing portion to ensure the first fixing portion to be fitted around the door panel.

The second fixing portion may be configured to be molded with the second insert at the time of molding.

According to the vehicle door pinch detection apparatus including the above-mentioned configurations with improved detection performance, a pinch may be detected on the internal and external sides of the vehicle when the door is closed, improving a precision of pinch detection.

Furthermore, since the pinch may be detected on the external side of the vehicle in a resistance-detective manner, it is possible to easily detect a pinch due to an object as well as a passenger's body, and thus prevent pinching accidents on the external side of the door.

Furthermore, since the door pinch by the occupant's body may be detected on an internal side of the vehicle in an impedance-detective manner, it is possible to detect the pinch by the occupant's body when the door is closing, while the occupant seats in the vehicle.

Since the pinch by the occupant's body or the object may be detected in different ways on the outside and the interior of the vehicle, it is possible to prevent a safety accident caused by the occupant's body being directly pinched in the door, or a safety accident caused by the occupant's belongings being pinched in the door and dragged.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
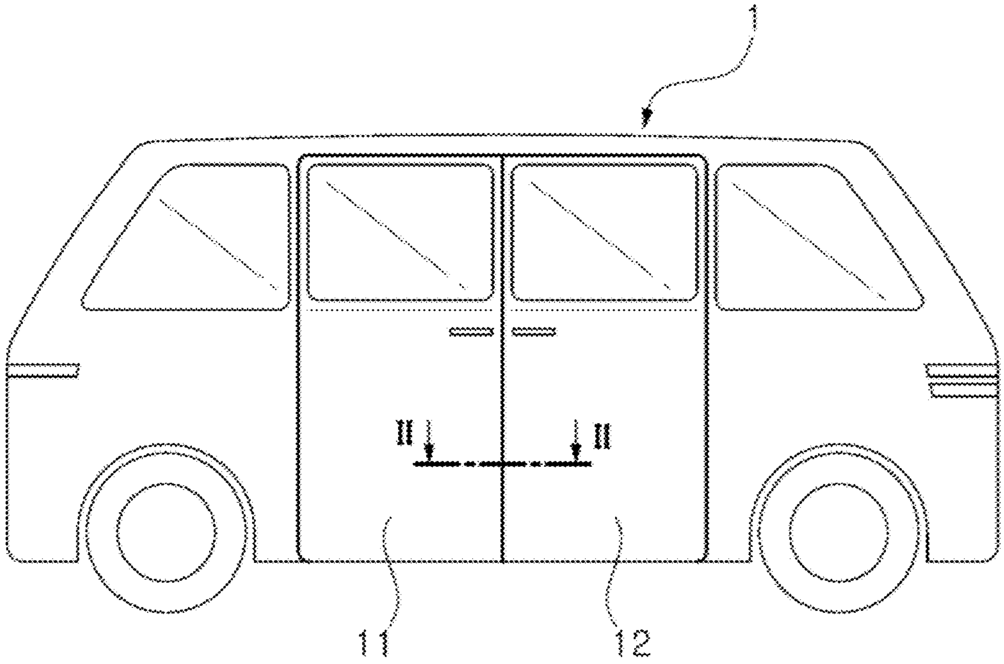
FIG. 1 is a side diagram illustrating a vehicle including a vehicle door pinch detection apparatus with improved detection performance according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a vehicle door pinch detection apparatus with improved detection performance according to an exemplary embodiment of the present disclosure will be described in detail with reference to the accompanying drawings.

FIG. 1 illustrates an example of a vehicle 1 including a vehicle door pinch detection apparatus with improved detection performance according to an exemplary embodiment of the present disclosure. The vehicle door pinch detection apparatus according to an exemplary embodiment of the present disclosure may be preferably applied to a vehicle 1 in which a pair of door sections 11 and 12 are slidably provided. The present disclosure may be applied to the vehicle 1, such as a purpose-built vehicle (PBV) between a front door section 11 and a rear door section 12.

In the vehicle 1 illustrated in FIG. 1, the front door section 11 may slidably open toward the front of the vehicle 1 and the rear door section 12 may slidably open toward the rear of the vehicle 1, wherein the vehicle door pinch detection apparatus of the present disclosure is provided to detect a pinch between the front door section 11 and the rear door section 12. of course, the vehicle door pinch detection system may also be applied to a vehicle in which the door sections are opened or closed in a swinging manner to detect a pinch between the vehicle door section and a vehicle body.

Figure 2:
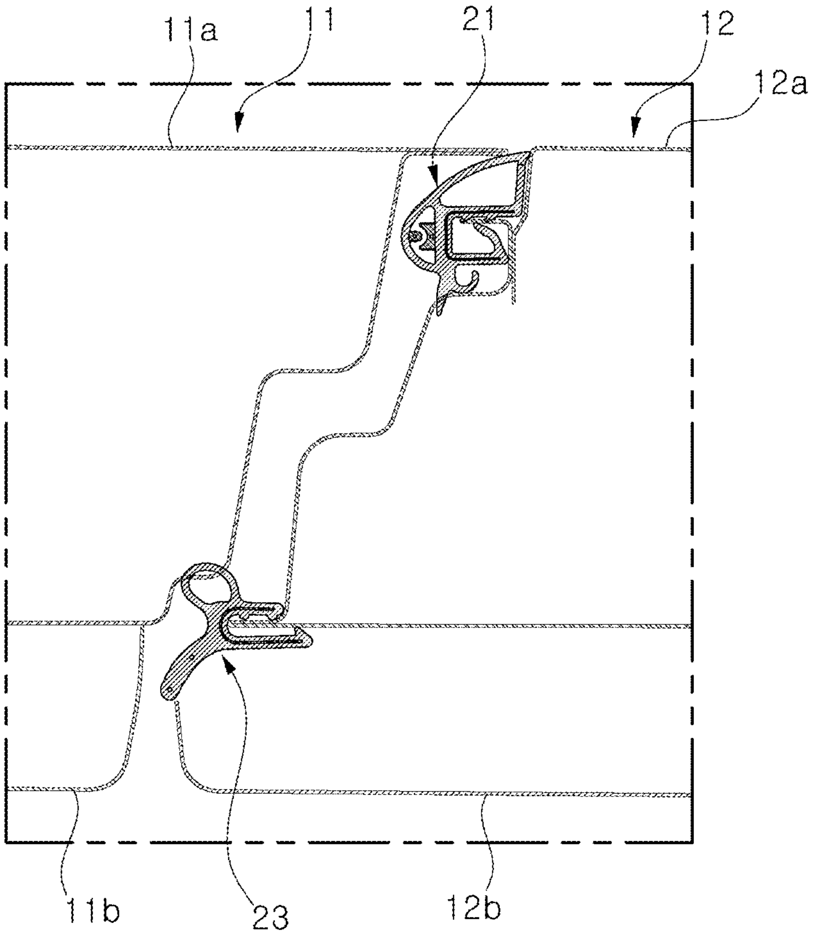
FIG. 2 is a cross-sectional diagram taken along line II-II of FIG. 1.

FIG. 2 illustrates a cross section at a position where the vehicle door pinch detection apparatus of the present disclosure is provided. An external pinch sensor 22 and an internal pinch sensor 24 for detecting a pinch between the front door section 11 and the rear door section 12 may be provided on an external weather strip 21 and an internal weather strip 23, respectively.

When the front door section 11 and the rear door section 12 are closed, the external pinch sensor 22 may detect a pinch on the external side of the door 11 and 12, and the internal pinch sensor 24 may detect a pinch on the internal side of the door 11 and 12.

The front door section 11 and the rear door section 12 may include door panels 11*a* and 12*a*, respectively, with door trims 11*b* and 12*b* on the internal side of the vehicle 1.

The external weather strip 21 and the internal weather strip 23 may be provided on any one of the front door sections 11 or the rear door section 12 to provide a sealing between the front door section 11 and the rear door section 12 when the front door section 11 and the rear door section 12 are closed.

Figure 3:
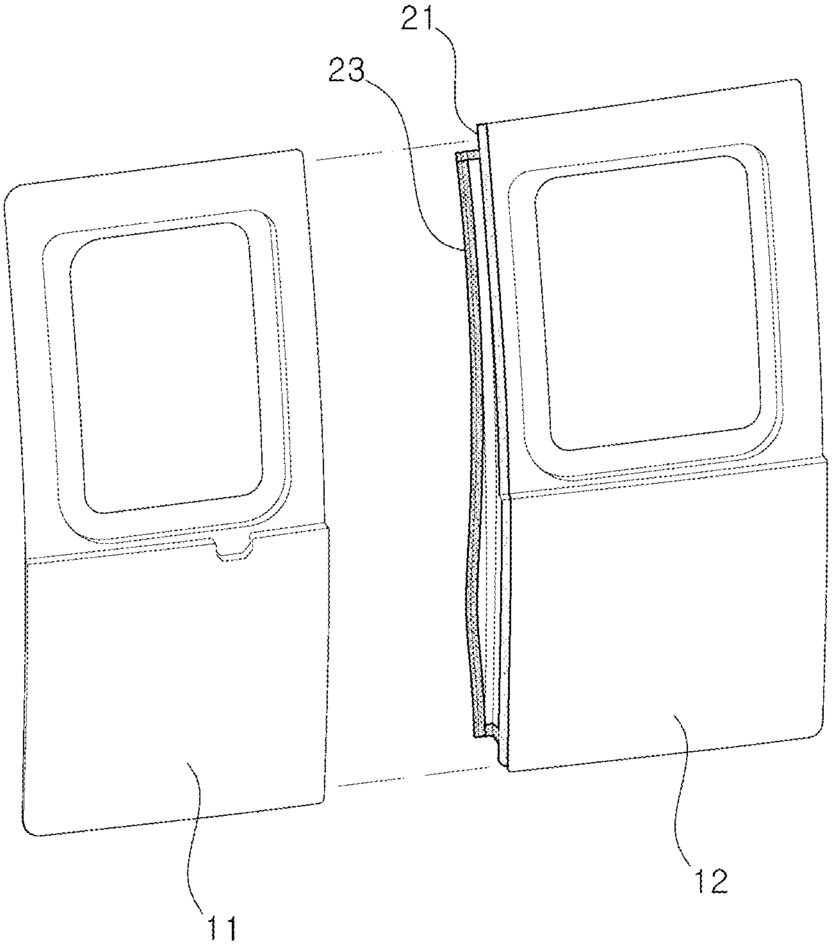
FIG. 3 is a perspective diagram seen from an outside of the vehicle in which an external weather strip and an internal weather strip are provided at a rear door section with an external pinch sensor and an internal pinch sensor of the vehicle door pinch detection apparatus according to an exemplary embodiment of the present disclosure provided thereon.
Figure 4:
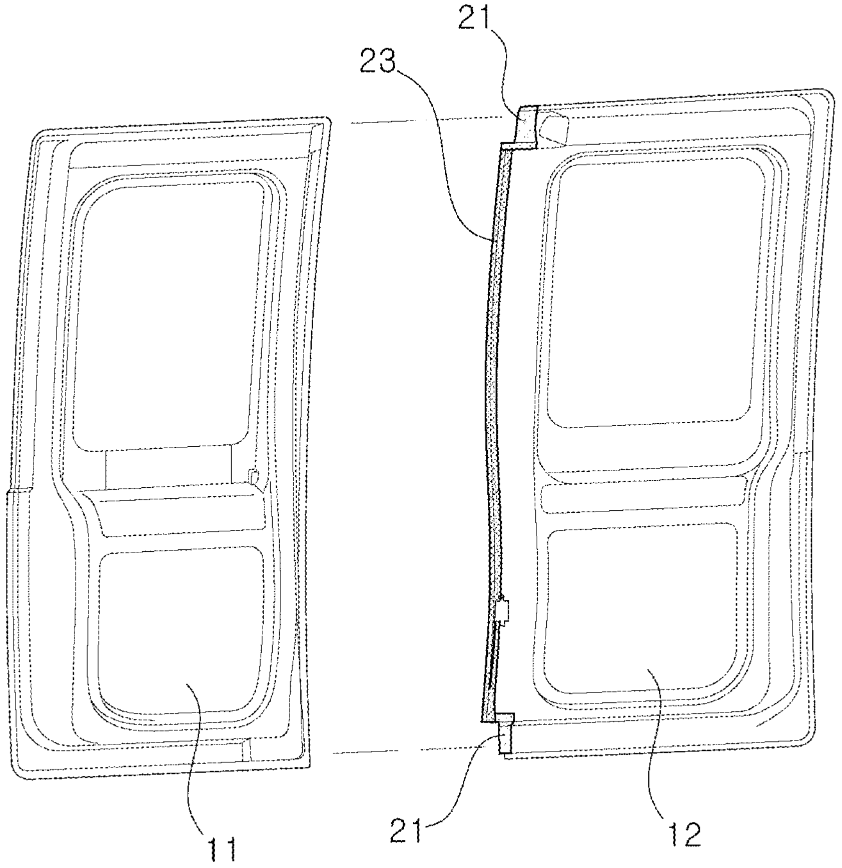
FIG. 4 is a perspective diagram seen from the interior of the vehicle in which an external weather strip and an internal weather strip are provided at the rear door section with an external pinch sensor and an internal pinch sensor of the vehicle door pinch detection apparatus according to an exemplary embodiment of the present disclosure provided thereon.

For example, as illustrated in FIG. 3 and FIG. 4, the external weather strip 21 and the internal weather strip 23 may be provided on the front end portion of the rear door section 12 so that the external weather strip 21 is fitted on the external side of the front end portion of the rear door section 12 and the internal weather strip 23 is fitted on the internal side of the front end portion of the rear door section 12. Thus, the external weather strip 21 and the internal weather strip 23 may seal the exterior and internal sides, respectively, of the vehicle 1 between the rear end portion of the front door section 11 and the front end portion of the rear door section 12.

The external pinch sensor 22 may be integrally formed with the other weather strip 21 on the external weather strip 21.

The external weather strip 21 may include a first fixing portion 21*a* fixedly fitted to one side of the door 11 or 12, a first insert 21*b* inserted into an interior of the first fixing portion 21*a*, a first hollow sealing portion 21*c* formed on an external side of the first fixing portion 21*a* to abut against the body or the other door 12 or 11 of the vehicle 1, and a first hollow sensor portion 21*d* formed to be connected to the first sealing portion 21*c* from the external side of the first fixing portion 21*a*.

The first insert 21*b* may be fabricated in a state of being previously inserted into the interior of the first fixing portion 21*a*, which is fixedly fitted on the door 11 or 12, for example, around the door panel 12*a* of the rear door section 12. The first insert 21*b* may ensure that the first fixing portion 21*a* remains fitted around the door panel 11*a* or 12*a*.

The first sealing portion 21*c* may be convexly formed in a hollow shape on the external side of the first fixing portion 21*a* to seal the door 11 or 12 against the other door 12 or 11 or the vehicle body side when the door 11 or 12 is closed.

The first sensor portion 21*d* may also be formed on the external side of the first fixing portion 21*a*. The external surface of the first sensor portion 21*d* may be formed to connect with the external surface of the first sealing portion 21*c*. The line connecting the external surface of the first sealing portion 21*c* and the external surface of the first sensor portion 21*d* may be formed in a form of a single curve, which becomes an exposed portion to the outside when the door 11 or 12 is opened.

The external pinch sensor 22 may be provided on the internal side of the first sensor portion 21*d*. The external pinch sensor 22 may be a contact sensor which is configured to detect a pinch by a variable resistance occurring when two spaced apart members 22*a* and 22*b* are brought into contact.

Figure 5:
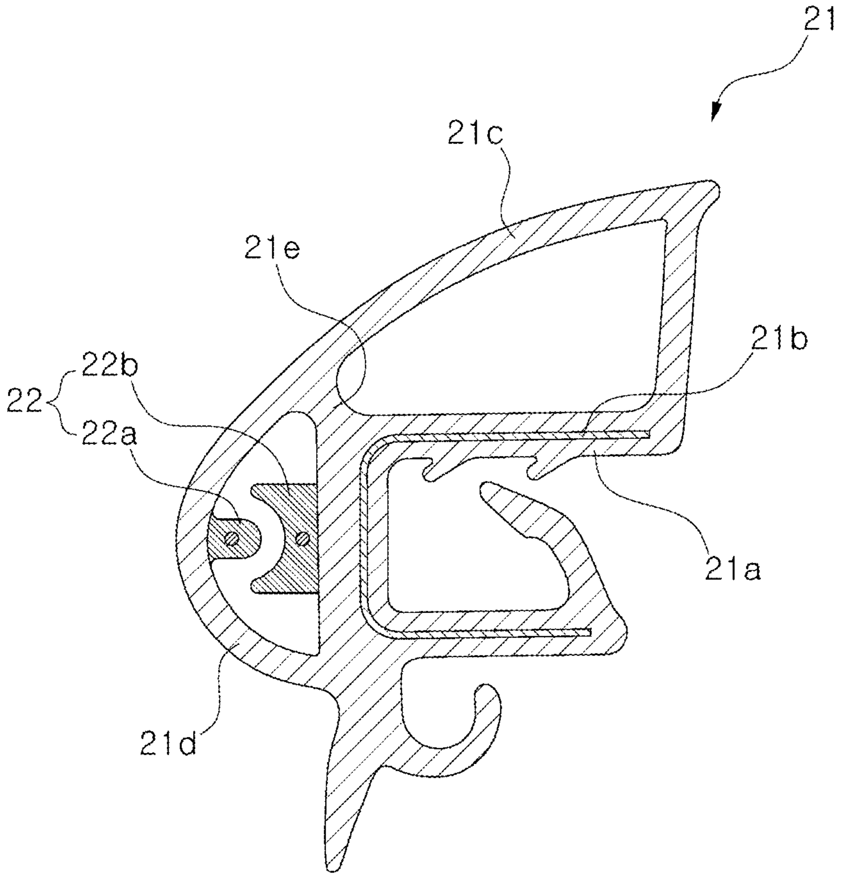
FIG. 5 is a cross-sectional diagram illustrating a state in which an external pinch sensor of the vehicle door pinch detection apparatus according to an exemplary embodiment of the present disclosure is provided on the external weather strip.
Figure 6:
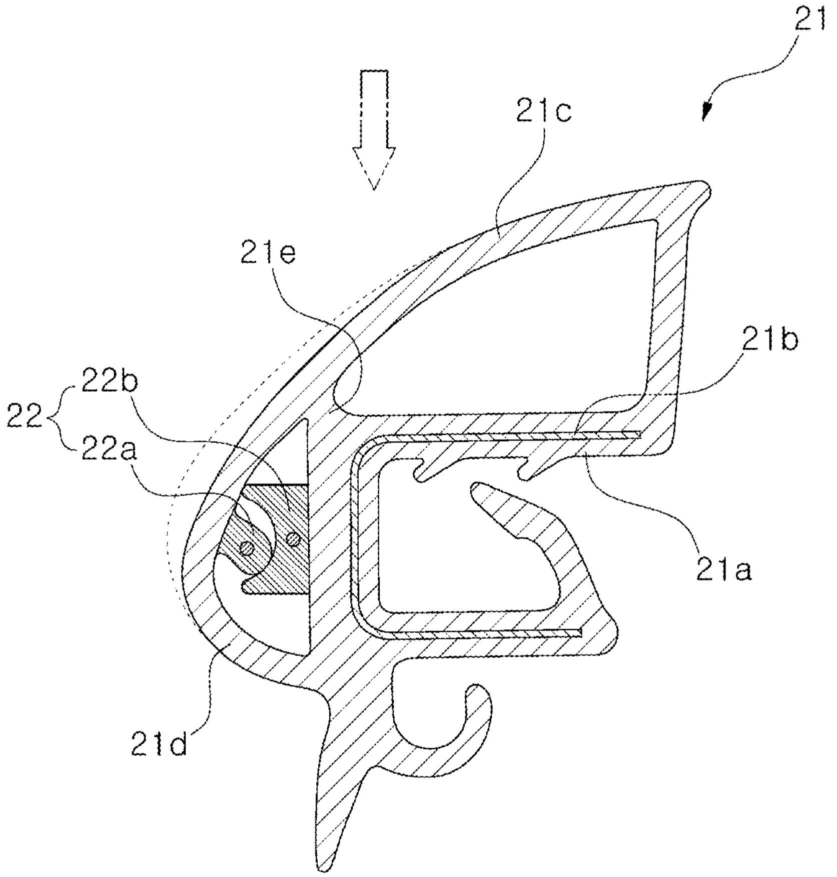
FIG. 6 is a cross-sectional diagram illustrating a state of the external pinch sensor of FIG. 5 detecting the door pinch situation.

The first member 22*a* and the second member 22*b* forming the external pinch sensor 22 may be provided spaced apart from each other on the internal surface of the first sensor portion 21*d*. For example, the first member 22*a* and the second member 22*b* may be provided opposite to each other on the internal surface of the first sensor portion 21*d*. That is, as illustrated in FIG. 5, the first member 22*a* may be provided on one side of the internal surface of the first sensor portion 21*d*, and the second member 22*b* may be provided on the other side of the internal surface of the first sensor portion 21*d* so that the first member 22*a* and the second member 22*b* are opposite to each other. Since the first member 22*a* and the second member 22*b* are made of a conductive rubber material, the first member 22*a* and the second member 22*b* may not be electrically connected to each other in a normal state in which the first member 22*a* and the second member 22*b* are spaced apart from each other. However, when the first and second members 22*a* and 22*b* become into contact with each other due to a pinch, the pinch is detected through a difference in voltage generated by a change in resistance in a circuit connected to the external pinch sensor 22. The circuit for detecting the pinch through the external pinch sensor 22 may include two resistors connected in parallel, wherein one of the resistors is connected in series with the external pinch sensor 22. In the instant case, normally current flows only through one resistor, but when a pinch occurs, current flows through both resistors, causing the resistance of the entire circuit to change, resulting in a voltage difference, which indicates the occurrence of the pinch.

The first member 22*a* may be formed in the shape of a protrusion, and the second member 22*b* may be formed in the shape of a concave groove in which an end portion of the first member 22*a* is accommodated. As the end portion of the first member 22*a* is formed to be surrounded by the second member 22*b*, the end portion of the first member 22*a* may be brought into contact with the second member 22*b* when a pinch occurs.

Since a circumferential portion of the first sensor portion 21*d* other than an area where the first sensor portion 21*d* supports the first member 22*a* and the second member 22*b* provided thereon are more deformable than the area, when the external surface of the external weather strip 21 is deformed due to the pinch, the first member 22*a* and the second member 22*b* may be easily contact with each other, which facilitates quick detection of the pinch.

Figure 7:
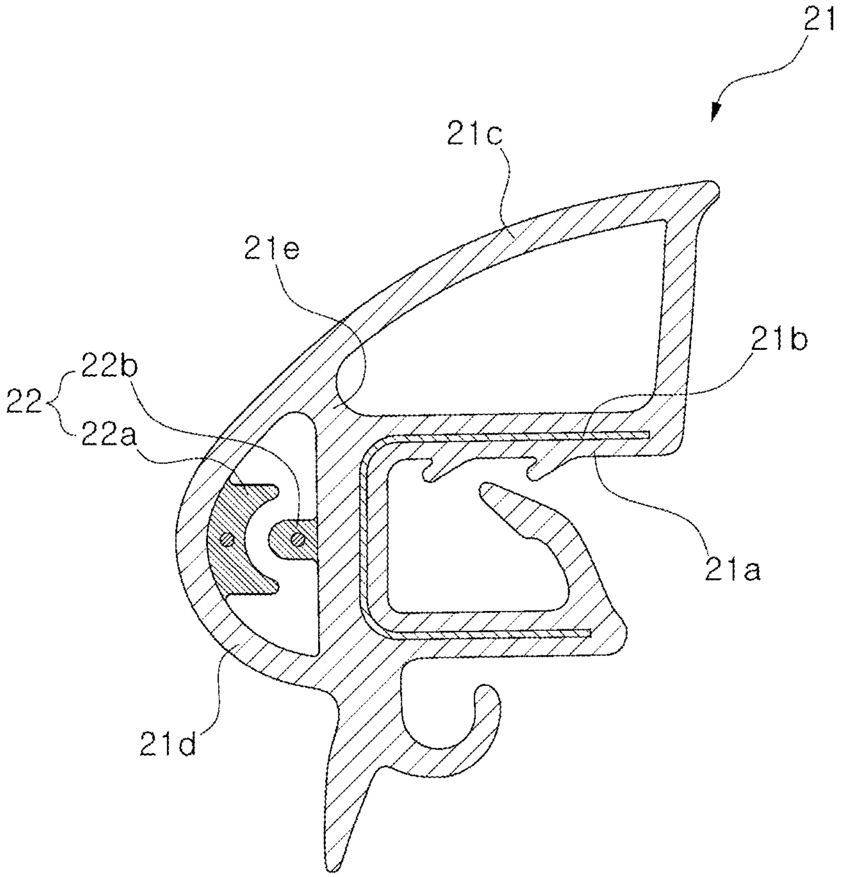
FIG. 7 is a cross-sectional diagram illustrating a state in which an external pinch sensor of the vehicle door pinch detection apparatus according to another exemplary embodiment of the present disclosure is provided on the external weather strip.

Alternatively, as illustrated in FIG. 7, the second member 22*b* may be formed in the shape of a protrusion, and the first member 22*a* may be formed in the shape of a concave groove in which an end portion of the second member 22*b* is accommodated.

The external weather strip 21 may be made of a non-conductive rubber material. Since the external weather strip 21 is made of a non-conductive material, the first member 22*a* and second member 22*b* may not be electrically connected in a normal state. Furthermore, since the external weather strip 21 is made of rubber, when the front door section 11 and the rear door section 12 are closed, the first sealing portion 21*c* may deform to seal the rear end portions of the front door section 11 and the front end portion of the rear door section 12, and prevent injury to the occupant's body in the event of pinching.

The external weather strip 21 may include a bridge portion 21*e* formed between the first sealing portion 21*c* and the first sensor portion 21*d* to separate the first sealing portion 21*c* and the first sensor portion 21*d*. The bridge portion 21*e* may separate the first sealing portion 21*c* and the first sensor portion 21*d*, while preventing external lines of the first sealing portion 21*c* and the first sensor portion 21*d* from being separated from the first fixing portion 21*a*. Accordingly, each of the internal space of the first sealing portion 21*c* and the first sensor portion 21*d* may be formed into a closed cross-section of a certain size, so that the sealing performance of the first sealing portion 21*c* is improved, and installation positions of the first member 22*a* and the second member 22*b* are maintained in the first sensor portion 21*d*.

The internal pinch sensor 24 may be integrally formed with the internal weather strip 23 on the internal weather strip 23.

The internal weather strip 23 may include a second fixing portion 23*a* fixedly fitted to the door 11 or 12, a second insert 23*b* inserted into an interior of the second fixing portion 23*a*, a second hollow sealing portion 23*c* formed on an external side of the second fixing portion 23*a* to abut against the body or the other door 12 or 11 of the vehicle 1, and a second sensor portion 23*d* formed to protrude from the second fixing portion 23*a* at a distance from the second sealing portion 23*c*.

The second fixing portion 23*a* may be fixed to the internal weather strip 23 by fitting around the door panel 11*a* or 12*a* forming the door 11 or 12. The second fixing portion 23*a* may be molded with the second insert 23*b* inserted therein at the time of molding, so that the second fixing portion 23*a* remains inserted in the door panel 11*a* or 12*a*.

The second sealing portion 23*c* may be convexly formed in a hollow shape on one side of the second fixing portion 23*a*. The second sealing portion 23*c* may be pressed against the other door 12 or 11 or the vehicle body.

The second sensor portion 23*d* may be formed to protrude from the second fixing portion 23*a* at a distance from the second sealing portion 23*c*. The second sensor portion 23*d* may be formed to protrude from the second fixing portion 23*a* and surround a portion of an external side of a door trim 11*b* or 12*b* of the door 11 or 12 on which the internal weather strip 23 is provided. For example, when the internal weather strip 23 is provided on the rear door 12, the second sensor portion 23*d* may be formed to surround a portion of the door trim 12*b* of the rear door section 12.

Figure 8:
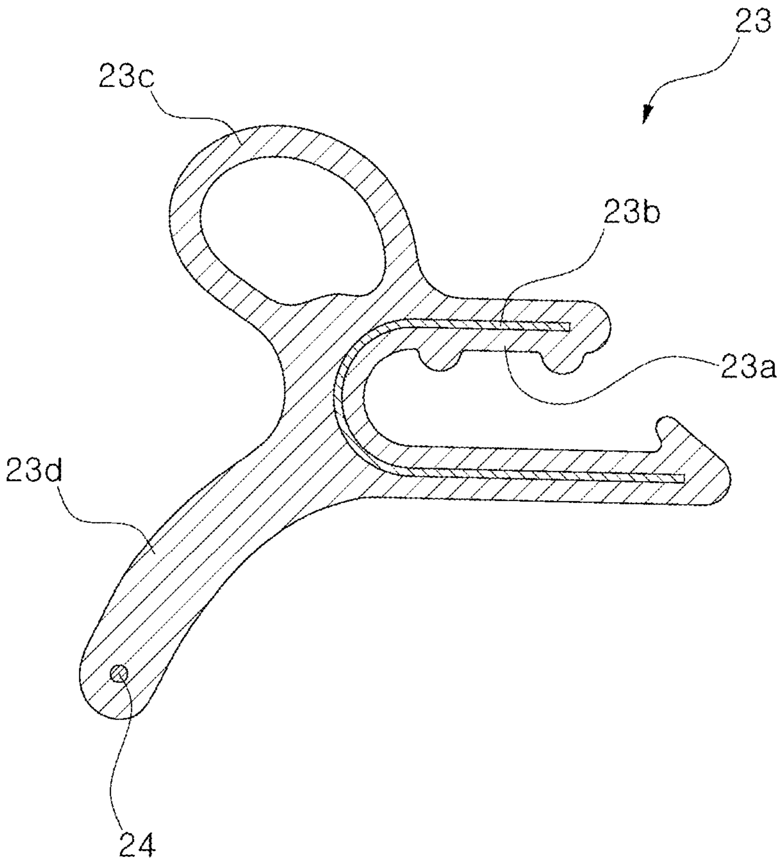
FIG. 8 is a cross-sectional diagram illustrating a state in which an internal pinch sensor of the vehicle door pinch detection apparatus according to an exemplary embodiment of the present disclosure is provided on the internal weather strip.
Figure 9:
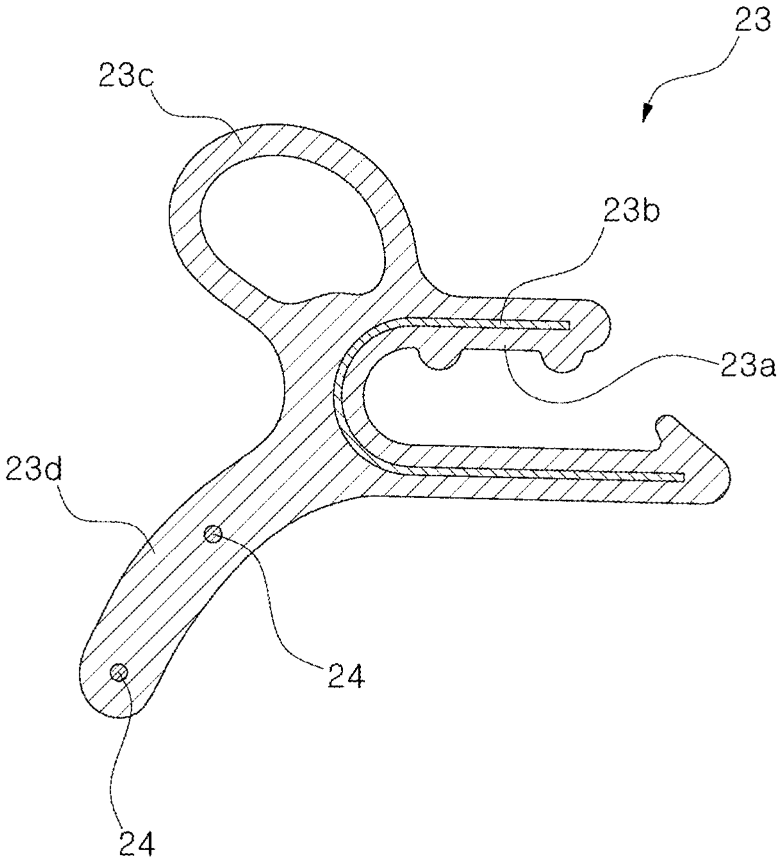
FIG. 9 is a cross-sectional diagram illustrating a state in which an internal pinch sensor of the vehicle door pinch detection apparatus according to another exemplary embodiment of the present disclosure is provided on the internal weather strip.

At least one internal pinch sensor 24 may be provided on the second sensor portion 23*d*. The internal pinch sensor 24 may be provided as an impedance-detective type sensor that generally detects an object, e.g., a user's touch on a flat screen or the like. The internal pinch sensor 24 may detect a pinch with a change in the impedance value when the occupant's body touches the second sensor portion 23*d*. When the impedance-detective type sensor is applied as the internal pinch sensor 24, the impedance-detective type sensor may have a high frequency band so that the output value varies depending on the object in contact with the sensor, allowing the pinch of the occupant's body to be detected accurately. If the second sensor portion 23*d* comes into contact with moisture, the second sensor portion 23*d* may transmit an output that differs from the pinching of the occupant's body. At least one internal pinch sensor 24 may be provided on the second sensor portion 23*d*. That is, as illustrated in FIG. 8, only one internal pinch sensor 24 may be provided, or as illustrated in FIG. 9, two or more internal pinch sensors 24 may be provided spaced apart from each other. If two or more internal pinch sensors 24 are provided, respective internal pinch sensors 24 may be used for different purposes. For example, if two internal pinch sensors 24 are provided, one internal pinch sensor 24 may detect an occupant's body touch and the other internal pinch sensor 24 may detect moisture, adjusting a sensitivity of the internal pinch sensors 24 to the occupant's body touch in rainy weather.

The whole portion of the internal weather strip 23 or only a portion of the internal weather strip 23 where the internal pinch sensor 24 is provided may be made of a non-conductive rubber material so as not to affect an operation of the internal pinch sensor 24.

As another exemplary embodiment of the present disclosure, the internal pinch sensor 24 may be a capacitive type sensor which is configured to detect a touch with a change in capacitance, instead of an impedance-detective type sensor.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle door pinch detection apparatus comprising:

a door provided on one side of a vehicle;

an external pinch sensor configured for detecting a pinch of an object on an external side of the door when an end portion of the door is adjacent a body of the vehicle or another door of the vehicle upon closing of the door; and an internal pinch sensor configured for detecting a pinch of an object on an internal side of the door when the end portion of the door is adjacent the body of the vehicle or the another door of the vehicle upon closing of the door, wherein the external pinch sensor is provided in an external weather strip provided on the external side of the door, and the internal pinch sensor is provided in an internal weather strip provided on the internal side of the door, wherein the external weather strip includes:

a first fixing portion fixedly fitted to the door;

a first insert inserted into the first fixing portion;

a first sealing portion formed on an external side of the first fixing portion to abut against the body of the vehicle or the another door of the vehicle upon closing of the door; and a first sensor portion connected to the first fixing portion, wherein the external pinch sensor is provided in an interior of the first sensor portion, wherein the internal weather strip includes:

a second fixing portion fixedly fitted to the door;

a second sealing portion formed on an external side of the second fixing portion to abut against the body of the vehicle or the another door of the vehicle upon closing of the door; and a second sensor portion formed to protrude from the second fixing portion at a position spaced apart from the second sealing portion, wherein the internal pinch sensor is provided in an interior of the second sensor portion, wherein the internal pinch sensor comprises a plurality of internal pinch sensors spaced apart from each other in the interior of the second sensor portion in a direction in which the second sensor portion extends, wherein the second sensor portion covers a gap formed between an internal door panel of the door and an interior door trim panel of the door and the second sensor portion is supported by the interior door trim panel, and wherein the plurality of internal pinch sensors are disposed on an external facing side of the interior door trim panel of the door.

2. The vehicle door pinch detection apparatus of claim 1, wherein the external pinch sensor is a contact sensor with a variable resistance and includes a plurality of members spaced apart from each other.

3. The vehicle door pinch detection apparatus of claim 2, wherein the plurality of members of the external pinch sensor includes:

a first member mounted on a first side of the interior of the first sensor portion; and a second member mounted spaced apart from the first member on a second side of the interior of the first sensor portion.

4. The vehicle door pinch detection apparatus of claim 3, wherein the external weather strip is made of a non-conductive rubber, and the first member and the second member are made of a conductive rubber.

5. The vehicle door pinch detection apparatus of claim 3, wherein the first member and the second member are configured to be electrically connected to each other when the external weather strip is deformed.

6. The vehicle door pinch detection apparatus of claim 3, wherein one of the first member and the second member is formed to have a shape of a concave groove, and the other of the first member and the second member is formed to have a shape of a protrusion to be accommodated in the concave groove.

7. The vehicle door pinch detection apparatus of claim 3, wherein the external weather strip includes a bridge portion formed between the first sealing portion and the first sensor portion to separate the first sealing portion and the first sensor portion.

8. The vehicle door pinch detection apparatus of claim 1, wherein the first insert is inserted into an interior of the first fixing portion.

9. The vehicle door pinch detection apparatus of claim 1, wherein the external weather strip and the internal weather strip are provided on a front end portion of the door in a height direction of the vehicle, and when the door and the another door of the vehicle are closed, the external weather strip and the internal weather strip abut against a rear end portion of the another door of the vehicle.

10. The vehicle door pinch detection apparatus of claim 1, wherein the first sealing portion is hollow and disposed on the external side of the first fixing portion.

11. The vehicle door pinch detection apparatus of claim 10, wherein the first sensor portion is hollow to accommodate the external pinch sensor therein.

12. The vehicle door pinch detection apparatus of claim 1, wherein the internal weather strip further includes:

a second insert inserted into the second fixing portion.

13. The vehicle door pinch detection apparatus of claim 12, wherein the internal pinch sensor is a non-contact impedance sensor.

14. The vehicle door pinch detection apparatus of claim 13, wherein the second sensor portion is made of a non-conductive rubber.

15. The vehicle door pinch detection apparatus of claim 12, wherein the second sealing portion is on the external side of the second fixing portion.

16. The vehicle door pinch detection apparatus of claim 12, wherein the second fixing portion is configured to be molded with the second insert.

* * * * *